(12) United States Patent
Lee et al.

(10) Patent No.: US 8,327,153 B2
(45) Date of Patent: Dec. 4, 2012

(54) METHOD AND SYSTEM FOR VERIFYING SOFTWARE PLATFORM OF VEHICLE

(75) Inventors: Jeong-Woo Lee, Daejeon (KR); Shin Kyung Lee, Daejeon (KR); Oh Cheon Kwon, Suwon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 308 days.

(21) Appl. No.: 12/853,672

(22) Filed: Aug. 10, 2010

(65) Prior Publication Data

US 2011/0138188 A1 Jun. 9, 2011

(30) Foreign Application Priority Data

Dec. 4, 2009 (KR) .................. 10-2009-0119963
Mar. 2, 2010 (KR) .................. 10-2010-0018689

(51) Int. Cl.
*G06F 11/30* (2006.01)
(52) U.S. Cl. ...................................... 713/187
(58) Field of Classification Search .................. 713/176, 713/180, 187, 193, 194; 726/26, 30
See application file for complete search history.

(56) References Cited

U.S. PATENT DOCUMENTS

| | | | |
|---|---|---|---|
| 5,708,712 A * | 1/1998 | Brinkmeyer et al. | 713/181 |
| 5,774,550 A * | 6/1998 | Brinkmeyer et al. | 713/168 |
| 7,327,227 B2 | 2/2008 | Ohtaki et al. | |
| 7,395,426 B2 | 7/2008 | Lee et al. | |
| 2008/0010466 A1 * | 1/2008 | Hopper | 713/187 |
| 2008/0192929 A1 | 8/2008 | Knechtel et al. | |
| 2010/0202346 A1 * | 8/2010 | Sitzes et al. | 370/328 |

FOREIGN PATENT DOCUMENTS

| | | |
|---|---|---|
| EP | 1959606 A1 | 8/2008 |
| KR | 10-0687915 | 2/2007 |
| KR | 10-0703777 | 3/2007 |

OTHER PUBLICATIONS

Guette, Gilles et al., "Using TPMs to Secure Vehicular Ad-Hoc Networks (VANETs)," WISTP 2008, LNCS 5019, pp. 106-116 (2008).

Kang, Sangwoo et al., "Security Enhancement method design in VANET using Authenticated Boot of TPM," Proceedings of Korea Computer Congress, vol. 36(1):216-221 (2009).

* cited by examiner

*Primary Examiner* — Beemnet Dada
(74) *Attorney, Agent, or Firm* — Nelson Mullins Riley & Scarborough LLP; EuiHoon Lee, Esq.

(57) ABSTRACT

A system for verifying a software platform of a vehicle including at least one electronic control unit receives a first final confirmation value corresponding to a hash value of software measured in the electronic control unit from an integrated security apparatus inside the vehicle and extends a hash value of normally operated software received from a software manufacturer of the electronic control unit to generate a second final confirmation value. Next, the system verifies the software platform of the vehicle based on results obtained by comparing the first final confirmation value with the second final confirmation value.

11 Claims, 2 Drawing Sheets

METHOD AND SYSTEM FOR VERIFYING SOFTWARE PLATFORM OF VEHICLE

CROSS-REFERENCE TO RELATED APPLICATION

This application claims priority to and the benefit of Korean Patent Application Nos. 10-2009-0119963 and 10-2010-0018689 filed in the Korean Intellectual Property Office on Dec. 4, 2009 and Mar. 2, 2010, the entire contents of which are incorporated herein by reference.

BACKGROUND OF THE INVENTION (a) Field of the Invention

The present invention relates to a method and a system for verifying a software platform of a vehicle.

(b) Description of the Related Art

Electronic control units (ECUs) are electronic control units that are disposed inside a vehicle.

Generally, the ECU is a microprocessor-based embedded system that includes a read only memory (ROM), a random access memory (RAM), an electrically programmable read-only memory (EEPROM), and a flash memory.

The ECU disposed inside a vehicle may update or reset the software of the ECU based on results obtained by flashing the software (S/W). However, the software of the ECU is maliciously changed during a process of updating or resetting the software, such that it cannot perform the existing functions.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and a system for verifying a software platform of a vehicle having advantage of verifying that software of various electronic control units of a vehicle is honest goods provided by a manufacturer.

An exemplary embodiment of the present invention provides a method for verifying a software platform of a vehicle including at least one electronic control unit, including:

receiving a first final confirmation value corresponding to a hash value of software measured in the electronic control unit from an integrated security apparatus inside the vehicle; extending a hash value of normally operated software received from a software manufacturer of the electronic control unit based on an initial value and data processing sequence input by a driver of the vehicle to generate a second final confirmation value; and verifying the software platform of the vehicle based on results obtained by comparing the first final confirmation value with the second final confirmation value.

Another embodiment of the present invention provides a system for verifying a software platform of a vehicle including at least one electronic control unit, including:

a trusted platform module that extends a hash value of normally operated software in the electronic control unit to generate a reference confirmation value; and an integrity verification module that receives a final confirmation value corresponding to a hash value of software measured in the electronic control unit from an integrated security apparatus inside the vehicle and verifies the software platform of the vehicle based on results obtained by comparing the final confirmation value with the reference confirmation value.

DETAILED DESCRIPTION OF THE EMBODIMENTS

Figure 1:
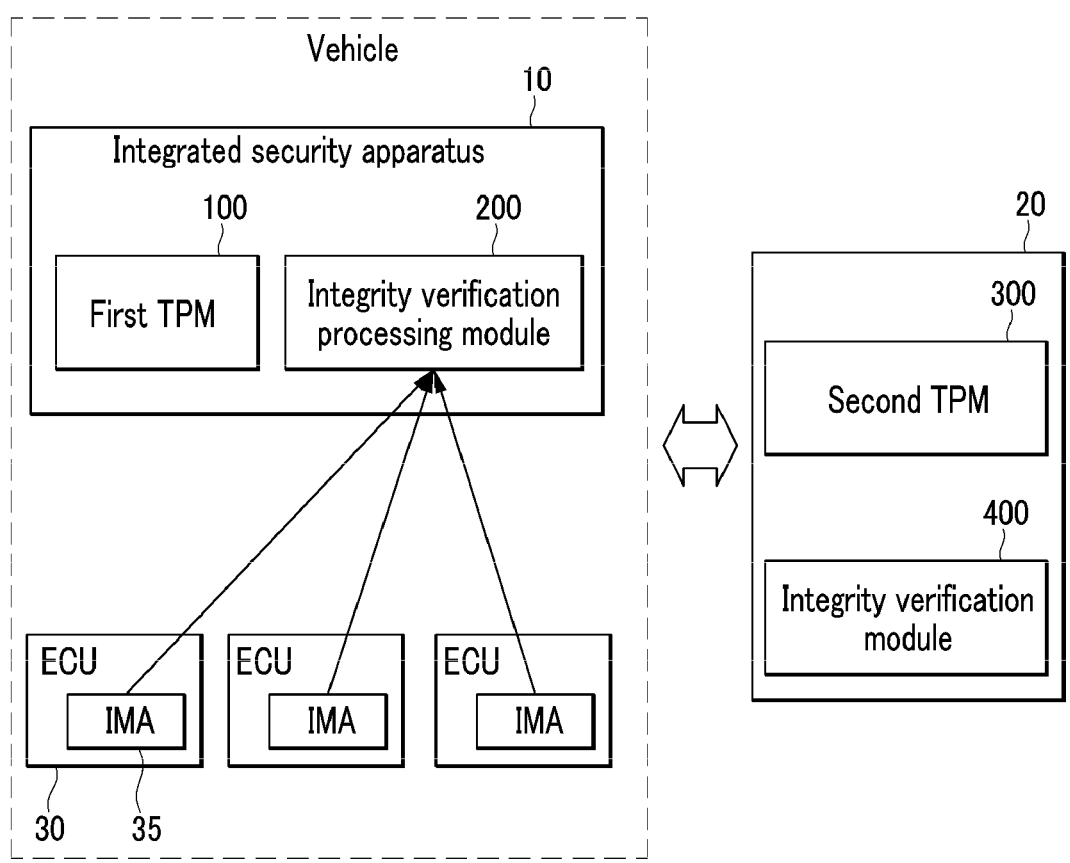
FIG. 1 is a diagram showing a system 20 for verifying a software platform of a vehicle according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

In the specification, a terminal may designate a mobile station (MS), a terminal, a mobile terminal (MT), a subscriber station (SS), a portable subscriber station (PSS), user equipment (UE), access terminal (AT), etc. and may include functions of all or a part of the mobile station, the mobile terminal, the subscriber station, the portable subscriber station, the user equipment, the access terminal, etc.

Hereinafter, a system and a method for verifying software platform of a vehicle according to an exemplary embodiment of the present invention will be described with reference to drawings.

First, a trusted platform module (hereinafter, referred to a "TPM") is a hardware module verifying that the currently used platform is in a safe state. The TPM embeds a crypto module (not shown) and stores results obtained by measuring the integrity of the platform in a specific register, for example, a platform configuration register (hereinafter, referred to as "PCR"). Further, the TPM verifies the attestation and the integrity of the platform by using the crypto module as well as a random number generator, etc. At this time, hash values are attached to the existing PCR values according to an extension command. for example, new PCR values are generated by using a hash function such as SHA-1 such that one PCR stores the newly generated PCR values. That is, one PCR may store many measurement values.

In case of the mobile TPM used in the mobile device, reference integrity metrics (hereinafter, referred to a "RIM") and target integrity metrics (hereinafter, referred to as "TIM") verify the integrity of software by using the hash values for the images of software.

The RIM generates the values and stores them based on measurement results before initiation in loading or executing software or hardware.

The TIM represents the integrity metrics of target objects or components measured by a measurement agent of objects each time a power supply is turned-on.

It is verified that the corresponding software is not changed by comparing the TIM values measured each time with the stored RIM values. The RIM is issued in a form of certificate such as RIM Cert and verified by signing the certificate.

Referring FIG. 1, an environment where the system for verifying a software platform of a vehicle is used will be described in detail with reference to the technology of verifying the integrity of the TPM.

FIG. 1 is an environment where the system for verifying a software platform of a vehicle according to an exemplary embodiment of the present invention is used.

First, a system 20 for verifying a software platform of a vehicle can be applied to a terminal of a driver but it is not limited thereto.

Referring to FIG. 1, the system 20 for verifying a software platform of a vehicle is operated by being connected with an integrated security apparatus 10 disposed inside the vehicle. At this time, the vehicle includes at least one electronic control unit (hereinafter, referred to as "ECUs") 30.

The system 20 for verifying a software platform of a vehicle according to an exemplary embodiment of the present invention verifies the software platform of the vehicle by using the integrated security apparatus 10, based on hash values corresponding to the software of the ECU 30. Each ECU 30 includes integrity measurement agent (hereinafter, referred to as "IMA") 35 of software. The IMA 35 measures the hash values of software of the corresponding ECU 30.

The integrated security apparatus 10 includes a trusted platform module (hereinafter, referred to as "first TPM") 100 and an integrity verification processing module 200. Further, the system 20 for verifying a software platform of a vehicle includes a second TPM 300 and an integrity verification module 400.

The first TPM 100 and the second TPM 300 each is a hardware module verifying that the currently used platform is in a safe state.

The integrity verification processing module 200 collects the hash values of software of the ECU 30 and requests the extension of the collected hash values to the first TPM 100. At this time, the integrity verification processing module 200 requests to the extension of the hash values to the first TPM 100 by using an initial value and a data processing sequence that are input to the terminal of the driver.

Further, the integrity verification processing module 200 temporally stores the collected hash values of software of the ECU 30 in protected areas provided in the first TPM 100.

Next, the integrity verification processing module 200 receives the results (integrity verification values extended by the specific register of the first TPM 100) corresponding to the request, that is, the first final confirmation values from the first TPM 100. The data processing sequence is a sequence that the integrity verification processing module 200 requests the extension of the hash values of the corresponding software of each ECU 30 to the first TPM 100. At this time, the integrity verification processing module 200 encrypts the first final confirmation values and transmits them to the terminal since the first final confirmation values are varied according to the data processing sequence.

The communication between the integrated security apparatus 10 disposed inside the vehicle and the system 20 for verifying a software platform of a vehicle according to an exemplary embodiment of the present invention uses a crypto module (not shown) of the TPM and an attestation procedure, etc., to form the attestation and the safe communication channel for each of them.

The system 20 for verifying a software platform of a vehicle receives the hash values of normally operated software from the software of each ECU 30 and stores them in the protected areas (not shown). At this time, the system 20 for verifying software platform receives the hash values of software in a form of certificate. Further, when first attempting the verification, it previously receives the initial value through the terminal.

An integrity verification module 400 decrypts the encrypted first final confirmation values.

Next, the integrity verification module 400 requests the extension of the hash values of software of the ECU 30 stored in the previously protected areas to the second TPM 300 by using the set initial values and the data processing sequence that are input to the terminal by the driver.

The integrity verification module 400 receives the results corresponding to the request, that is, the second final confirmation values extended by the specific PCR of the second TPM 300 to compare whether the second final confirmation values are equal to the first final confirmation values. At this time, since the second final confirmation values are values generated based on the hash values of normally operated software of software manufacturers of ECU 30, they are reference confirmation values that determine the software corresponding to the first final confirmation values.

When the first final confirmation values are not equal to the second final confirmation values, the integrity verification module 400 determines that the software of the ECU 30 inside the vehicle is changed. Further, the integrity verification module 400 informs the driver that the software of the ECU 30 is changed, such that the driver can take the corresponding action.

When the first final confirmation values are equal to the second final confirmation values, the integrity verification module 400 determines that the software of the ECU 30 of the vehicle is not changed, that is, the software thereof is normally operated.

Further, the integrity verification module 400 receives the initial value and the data processing sequence from the driver through the terminal when the software of the ECU 30 is normally operated or the software of the ECU 30 is changed, thereby updating the corresponding data processing sequence and initial values. Next, the integrity verification module 400 encrypts the newly set data processing sequence and initial value and transmits the encrypted results to the integrated security apparatus 10. At this time, the integrated security apparatus 10 updates the values stored in the protected areas to the encrypted result values.

Next, a method for verifying software platform of a vehicle will be described in detail with reference to FIG. 2.

Figure 2:
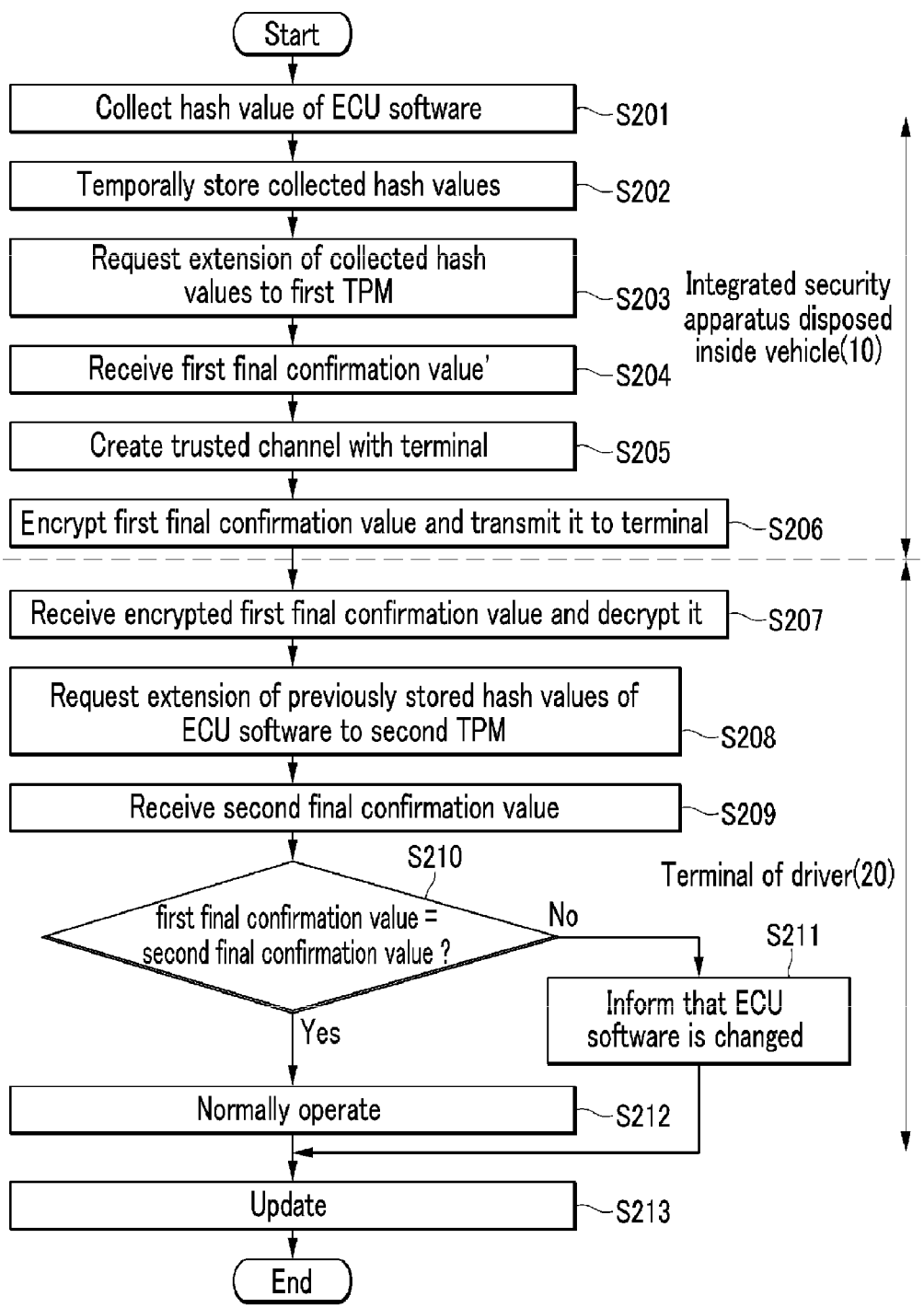
FIG. 2 is a diagram showing a method for verifying a software platform of a vehicle according to an exemplary embodiment of the present invention.

FIG. 2 is a diagram showing a method for verifying a software platform of a vehicle according to an exemplary embodiment of the present invention.

First, the system 20 for verifying software platform of a vehicle can be applied to the terminal of the driver and includes the integrity verification processing module 200 and the second TPM 300.

The system 20 for verifying software platform of a vehicle according to an exemplary embodiment of the present invention verifies the software platform of the vehicle by using the integrated security apparatus 10 disposed inside the vehicle based on the hash values corresponding to the software of the ECU 30. The integrated security apparatus 10 includes the first TPM 100 and the integrity verification processing module 200.

The system 20 for verifying software platform of a vehicle may be applied when the driver starts the vehicle. When the driver starts the vehicle, the IMA 35 of the ECU 30 measures the hash values of the ECU software.

Referring to FIG. 2, the integrated security apparatus 10 collects the hash values of software of each ECU 30 (S201).

The hash values of software of the ECU 30 are values measured the IMA 35 included in each ECU 30.

The integrity verification processing module 200 in the integrated security apparatus 10 temporally stores the collected hash values of software of the ECU 30 in the protected areas provided in the first TPM 100 (S202).

The integrity verification processing module 200 requests the extension of the hash values to the first TPM 100 by using the initial value and the data processing sequence received from the terminal (S203). The data processing sequence is a sequence that the integrity verification processing module 200 requests the extension of the hash values of the corresponding software of each ECU 30 to the first TPM 100.

Next, the integrity verification processing module 200 receives the integrity verification values (the first final confirmation values extending the hash values) corresponding to the request (S204).

The integrated security apparatus 10 creates the trusted channel to the system 20 for verifying software platform of a vehicle by using the attestation procedure of the TPM and exchanges public keys generated through the first TPM 100 and the second TPM 300 on the trusted channel (S205).

The integrated security apparatus 10 encrypts the first final confirmation values and transmits it to the system 20 for verifying software platform of a vehicle (S206).

The integrity verification module 400 decrypts the encrypted first final confirmation values (S207). The integrity verification module 400 requests the extension of the previously stored hash values of software of the ECU 30 to the second TPM 300 by using the initial value and the data processing sequence (S208). The previously stored hash values of software of the ECU 30 are values that are stored in the protected areas by allowing the terminal to the hash values of normally operated software from the software manufacturers of each ECU 30.

The integrity verification module 400 receives the integrity verification values (the second final confirmation values extending the hash values) corresponding to the request (S209).

The integrity verification module 400 compares the first final confirmation values with the second final confirmation values to determine whether they are equal to each other (S210).

When the first final confirmation values are not equal to the second final confirmation values, the integrity verification module 400 informs the driver that the software of the ECU 30 inside the vehicle is changed (S211).

When the first final confirmation values are equal to the second final confirmation values, the integrity verification module 400 determines that the software of the ECU 30 of the vehicle is not changed, that is, the software thereof is normally operated (S212).

Next, the integrity verification module 400 updates the data processing sequence and the initial value when the software of the ECU 30 is normally operated or the software of the ECU 30 is changed (S213).

As describe above, the present invention can verify the integrity of the S/W of various ECU in the vehicle by using the TPM, the trusted platform module and the terminal of the driver. Further, the present invention verifies the integrity of the ECU S/W to prevent the ECU from being abnormally performed and to enable the driver to safely drive the vehicle.

According to an exemplary embodiment of the present invention, the method and system for verifying a software platform of a vehicle can verify integrity of software disposed inside various electronic control units by using the trusted security module in a vehicle.

Further, by verifying the integrity of software of the electronic control units, the abnormal operation of the electronic control units can be prevented and the driver can safely drive a vehicle.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for verifying a software platform of a vehicle including at least one electronic control unit, comprising:
   receiving a first final confirmation value corresponding to a hash value of software measured in the electronic control unit from an integrated security apparatus inside the vehicle;
   extending a hash value of normally operated software received from a software manufacturer of the electronic control unit based on an initial value and data processing sequence input by a driver of the vehicle to generate a second final confirmation value;
   verifying the software platform of the vehicle based on results obtained by comparing the first final confirmation value with the second final confirmation value, and
   encrypting the initial value and the data processing sequence input by the driver of the vehicle and transmitting them to the integrated security apparatus, prior to the receiving, wherein the first final confirmation value is generated by extending the measured hash value of software with the initial value and the data processing sequence in a trusted platform module included in the integrated security apparatus.

2. The method of claim 1, wherein:
   the verifying includes
   determining that the software of the electronic control unit inside the vehicle is changed when the first final confirmation value is not equal to the second final confirmation value; and
   informing the driver that the software is changed.

3. The method of claim 1, wherein:
   the verifying includes
   determining that the software of the electronic control unit inside the vehicle is normally operated when the first final confirmation value is equal to the second final confirmation value.

4. The method of claim 1, wherein: the data processing sequence corresponds to a sequence extending the hash value of software in the integrated security apparatus.

5. A system for verifying a software platform of a vehicle including at least one electronic control unit, comprising:
   a trusted platform module that extends a hash value of normally operated software in the electronic control unit to generate a reference confirmation value; and
   an integrity verification module that receives a final confirmation value corresponding to a hash value of software measured in the electronic control unit from an integrated security apparatus inside the vehicle and verifies the software platform of the vehicle based on results obtained by comparing the final confirmation value with the reference confirmation value, wherein the integrated security apparatus includes an integrity verification processing module that collects the hash value of software measured in the electronic control apparatus and requests the extension of the collected hash value, and a trusted platform module that extends the hash value based on an initial value and a data processing sequence that are input by the driver of the vehicle to generate the final confirmation value.

6. The system of claim 5, wherein:

the integrity verification module determines that the software of the electronic control unit inside the vehicle is changed when the final confirmation value is not equal to the reference confirmation value.

7. The system of claim 5, wherein:

the integrity verification module determines that the software of the electronic control unit inside the vehicle is normally operated when the first final confirmation value is equal to the second final confirmation value.

8. The system of claim 5, wherein:

the trusted platform module includes a register that stores results verifying integrity of the software platform.

9. The system of claim 5, wherein:

the electronic control unit includes an integrity measurement agent that measures a hash value of software.

10. The system of claim 5, wherein: the data processing sequence corresponds to a sequence that extends the hash value of software according to a request from the integrity verification processing module to the trusted platform module.

11. The system of claim 5, wherein:

the reference confirmation value corresponds to a hash value of normally operated software provided from a software manufacturer of the electronic control unit.

* * * * *